United States Patent [19]

Okine et al.

[11] Patent Number: 5,380,480
[45] Date of Patent: Jan. 10, 1995

[54] PROCESS OF MAKING A CONSOLIDATED PART

[75] Inventors: Richard K. Okine, Wilmington; Albert S. Tam, Newark, both of Del.

[73] Assignee: E. I. Du Pont de Nemours and Company, Wilmington, Del.

[21] Appl. No.: 99,845

[22] Filed: Aug. 4, 1993

[51] Int. Cl.⁶ .............................................. B29C 33/00
[52] U.S. Cl. ..................................... 264/316; 264/320; 264/322
[58] Field of Search ............... 264/257, 258, 320, 322, 264/316; 156/212, 222, 224, 308.2, 309.9

[56] References Cited

U.S. PATENT DOCUMENTS

| | | | |
|---|---|---|---|
| 4,271,116 | 6/1981 | Jones | 264/221 |
| 4,304,751 | 12/1981 | Li et al. | 264/322 |
| 4,379,801 | 4/1983 | Weaver et al. | 428/220 |
| 4,576,776 | 3/1986 | Anderson | 264/510 |
| 4,671,837 | 6/1987 | Stewart | 156/245 |
| 4,770,838 | 9/1988 | Cattanaeh et al. | 264/510 |
| 4,957,684 | 9/1990 | Kia | 264/257 |
| 4,970,044 | 11/1990 | Kim et al. | 264/320 X |
| 5,047,198 | 9/1991 | Kim | 264/257 |
| 5,066,351 | 11/1991 | Knoll | 156/212 |

*Primary Examiner*—Leo B. Tentoni

[57] ABSTRACT

A thermoplastic composite sheet is used as a tool or tool liner for thermoforming thermoplastic composite sheets into parts having uneven sections. A more uniform consolidation of the part is achieved that has not been previously attainable in open mold processing at high forming temperatures.

6 Claims, 3 Drawing Sheets

PROCESS OF MAKING A CONSOLIDATED PART

BACKGROUND OF THE INVENTION

This invention relates to the use of reinforced thermoplastic materials as a consolidation (pressurizing) medium in the manufacture of composite articles. More particularly, it relates to the molding of high temperature thermoplastic composites in an open mold press.

The manufacture of composite articles usually requires the application of uniform pressure to consolidate the part to produce void-free articles. The pressurizing medium must conform to the finished part surface and evenly distribute the applied pressure. Current techniques involve enclosed molds where one or several sides can move to impart pressure on the molded article. A special case of this is diaphragm forming where the composite article is placed between a deformable diaphragm and a single-sided tool. An entrapped fluid acts upon the diaphragm, applying pressure on the article to both form and consolidate it. When rigid molds are used and the molded material itself is not easily flowable, a compliant surface, such as silicone rubber or soft aluminum, can be provided to aid in redistributing the pressure to make it more uniform.

Molding of advanced thermoplastic composites usually takes place above 370° C. and requires consolidation pressures up to 500 psi or more. Current compliant materials are inadequate in providing the desired effect at these conditions. For example, silicone rubber begins to degrade above 260° C. For open molds, the consolidation pressures can also be high enough to squeeze out the silicone rubber. At the other extreme, pressures required to cause adequate flow in soft aluminum at these temperatures are usually much higher than required for consolidation and pressure is not effectively distributed.

Several factors point to the need for a compliant interlayer to serve as a consolidation medium between the material and the tool.

First, to apply adequate pressure during the consolidation step, the tool surface must closely match the surface of the formed part. Should any gaps exist between the tool and the material, the internal fiber stresses cause the material to puff out to the tool surface, allowing voids to form in the cross section.

Second, even with a perfectly machined tool gap, the material itself can thin during the process creating a gap mismatch. The location of the thinning will be slightly different for each process cycle so the gap cannot simply be predicted and compensated in the machined tool gap.

Third, the material can wrinkle during forming if insufficient tension is applied. Local jamming of the tool gap by the wrinkle can change the tool gap over the entire surface of the part, causing voids elsewhere.

SUMMARY OF THE INVENTION

This invention involves the use of a reinforced thermoplastic resin matrix composite material as the consolidation medium. The composite consolidation medium concept tailors the flow characteristics of the compliant layer to effectively redistribute the applied pressure over the complex surface of a molded article. The flow compliance is designed in a manner analogous to designing the fiber/matrix combination in a solidified molded article for strength and stiffness requirements. The matrix in the consolidation medium is chosen to match the temperature characteristics of that in the molded article during processing. For the preferred consolidation medium, the matrix is itself a thermoplastic resin, chosen with glass transition and/or melt temperature compatible with that of the molded article such that pressure is transmitted hydraulically during the consolidation stage. Soft elastomeric matrices that exhibit excess flow in the unreinforced state may also be used. The fiber type in the consolidation medium is chosen to meet two major requirements. The first is to design the fiber loading to provide the proper matrix flow characteristics so that pressure is redistributed and maintained while minimizing the amount of molten resin squeezed out of the periphery of the mold. Second, the fiber form is chosen to allow the same or better degree of deformation as the molded article so that both can conform to the same article geometry. The consolidation medium can either be molded by itself and then used to subsequently consolidate a number of composite articles or molded together with the composite article to provide a single step process.

A preferred embodiment for the interlayer depends on the following factors either individually or in combination:

1. Fibrous reinforcement form, with aspect ratio much greater than 1, but fiber length much less than dimensions of the sheet.
2. Random orientation of fibers to provide similar flow properties in all directions.
3. Fiber loading between 20 to 60% volume fraction. The low end is determined by the need to maintain integrity and connectivity of the reinforcement throughout the process. The high end is determined by being less than that of the part to be formed.
4. An amorphous resin having a neat resin viscosity on the same order as that of the parent resin in the part to be formed, at process temperature.

DETAILED DESCRIPTION OF THE ILLUSTRATED EMBODIMENTS

Figure 1:
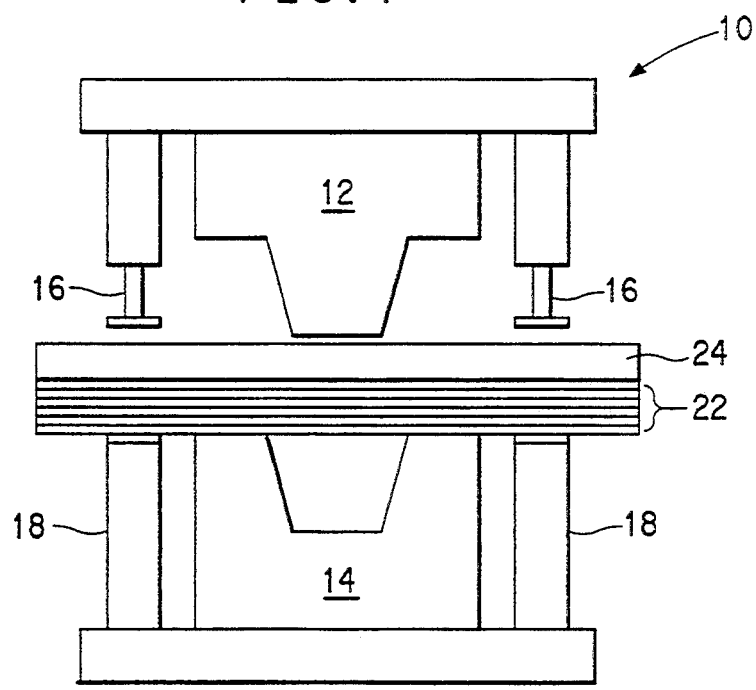
FIG. 1 is a schematic illustration of equipment that may be used in the forming method of this invention.

The embodiment chosen for purposes of illustration is shown in FIG. 1 to include a platen press 10 incorporating a male tool 12 and a female tool 14. At the periphery of the tools 12, 14 are clamps 16 and 18. An oven (not shown) is located adjacent the press 10. A sheet 22 and a compliant interlayer 24 are shown positioned between the tools 12, 14 and clamps 16, 18.

The preferred method of forming a thermoplastic resin sheet material having a melt forming temperature greater than 400° F. into a consolidated part in the open mold platen press 10 comprises the steps of heating the tools 12, 14 to the process temperature, then heating the sheet 22 and compliant interlayer 24 in the oven and moving the heated sheet 20 and interlayer 24 into the press and clamping the sheet and interlayer around their periphery. The press is then closed to deform the sheet and interlayer to form a part and pressure is applied to the press to consolidate the part. After the tools 12, 14 cool, the part is removed from the press. The sheet 22 is encased in a high temperature release film to provide a release of the part from the interlayer. The compliant interlayer 24 is itself a composite and takes advantage of the flow phenomenon in a composite material.

The method chosen for the molding of polymeric parts depends on the flow characteristics of the material and the desired properties of the final part. At one end of the flow spectrum is unreinforced resin whose flow depends only on the resin viscosity. As fiber reinforcement is introduced and where the resin is typically a low viscosity thermoset, more pressure is required to allow the material to flow than with the unreinforced resin. At the other end of the spectrum is advanced thermoplastic composites. Here, the combination of the higher resin viscosity of thermoplastics as compared to thermosets, together with higher fiber volume fraction, and hence much decreased permeability, means that these materials have very little flow during the forming process.

The use of closed molds for highly tailored and high fiber volume fraction parts is very costly, and it is difficult to control fiber orientation. It is therefore desirable to use open molds. Furthermore, the high resistance to flow of the advanced thermoplastic materials requires the use of compliant interlayers to redistribute the applied pressure uniformly over the surface of the part to achieve complete consolidation. However, since the molds are open, the use of highly flowable materials, e.g., unreinforced resins, as interlayers results in most of the resin being squeezed out and an inability to achieve sufficient pressure on the part being consolidated.

It is this flow property of composites which allows us to tailor a compliant interlayer to transmit and redistribute consolidation pressure to the formed part. The compliant interlayer is inserted between the part and one surface of the tool. The interlayer is designed to achieve two objectives:

1. To have a low flow resistance over the interior of the part to flow more easily than the parent part and fill in gaps and account for other tool gap/material thickness mismatches. By filling in the gaps, the interlayer provides a path to transmit the consolidation pressure from the tool to the entire part surface.
2. To have a high flow resistance in the periphery to build and maintain the interior pressure. The interlayer should create the pressure buildup with a minimum of resin squeezeout.

Flow properties required of the interlayer are thus opposite over the surface, and a uniform, unreinforced resin sheet cannot satisfy both simultaneously. The use of reinforcement along with mold design allows the tailoring of a single interlayer to have varying flow properties over its surface, and achieve both requirements. For a reinforced resin, the flow resistance, as indicated by an effective composite viscosity, is influenced by a number of factors:

1. Viscosity of the resin
2. Rate of deformation
3. Aspect ratio of the reinforcement
4. Geometrical form of the reinforcement
5. Loading, or volume fraction, of the reinforcement.

For thermoplastics, the viscosity of the neat resin depends on its temperature, and it is theoretically possible to tailor the viscosity by manipulating the temperature field. In practice, however, the parent part requires a uniform temperature field for both forming and consolidation, so this factor is not a suitable design choice. Instead, we choose the resin for the interlayer to be compatible with the processing temperature and melt properties of the resin in the part.

The rate of deformation is dictated by part geometry. Again, in practice, it is difficult to use this as a manipulated factor to achieve variable flow resistance over the part surface, as this would involve complicated tooling and actuation.

Thus, only factors 3–5, plus mold design, can be manipulated to meet the objectives. For a chosen aspect ratio and geometrical form of the reinforcement, the flow resistance of the layer increases as the loading of the reinforcement increases. Mold design affects flow resistance via the tool gap, wherein smaller tool gaps create higher flow resistance. Therefore, there are four possible combinations of mold and interlayer design to create the desired effect:

1. Constant nominal tool gap, constant initial layer flow properties over entire surface.
2. Constant nominal tool gap, different initial interlayer flow properties in the interior and around the periphery.
3. Reduced nominal tool gap in the periphery, constant initial layer flow properties over entire surface.
4. Reduced nominal tool gap in the periphery, different initial interlayer flow properties in the interior and around the periphery.

Cases 2 to 4 operate by varying the tool gap or the initial interlayer flow properties, or both. Case 1 takes advantage of the fact that for a mold with a horizontal flange around the entire perimeter, the tool gap in the periphery automatically is reduced relative to the interior of the part if the mold is compressed past the nominal gap. Then, with proper selection of the reinforcement form and aspect ratio, the resin squeezes out of the interlayer, but not the reinforcement, so that the reinforcement loading increases as the process progresses, and increases flow resistance in the periphery.

The complexity of the part geometry and the magnitude of flow required to overcome the expected tool gap/material thickness mismatch dictate which solution would work most economically. Cases 1 to 4 are ordered roughly in the amount of interlayer redistribution required in the interior, with Case 1 providing the least and Case 4 the most. Cases 2 and 3 can achieve similar effect, and selection depends on the economics of changing the mold versus varying the interlayer.

Figure 2:
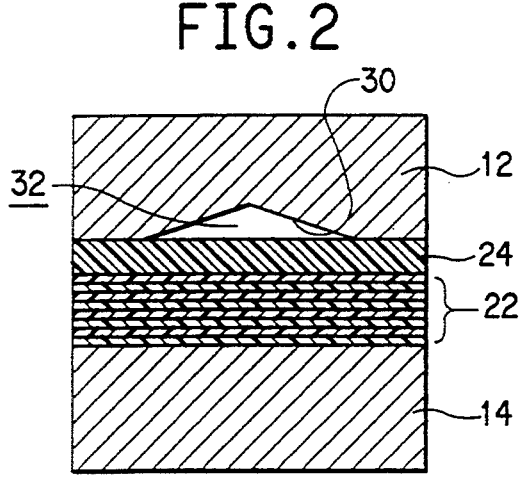
FIGS. 2, 2A, 3, 3A, 4, 4A schematically illustrate how the compliant interlayer of this invention flows to compensate for different tool gap/material thickness mismatches.
Figure 2A:
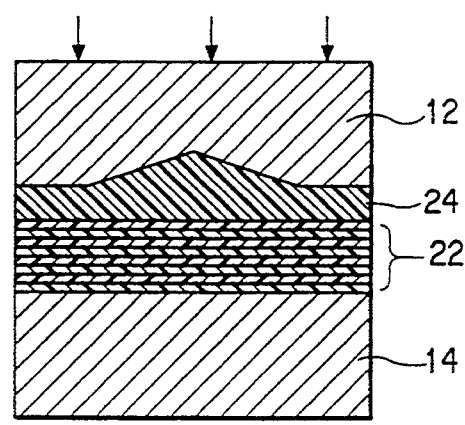
Figure 3:
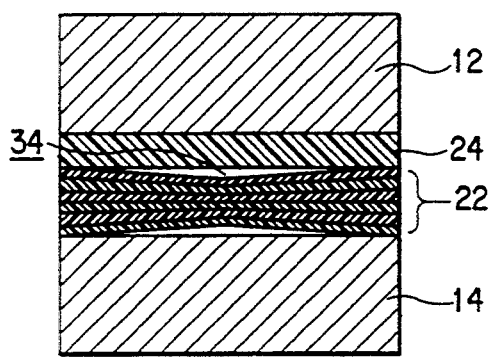
Figure 3A:
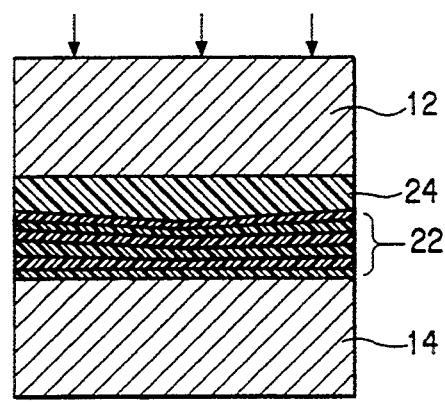
Figure 4:
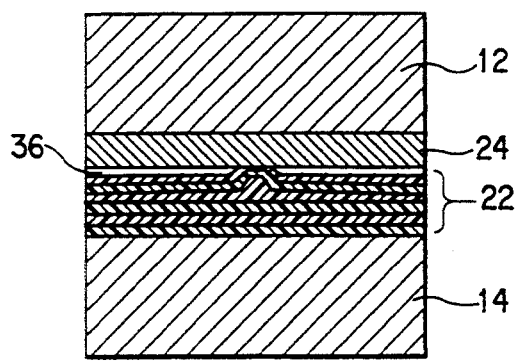
Figure 4A:
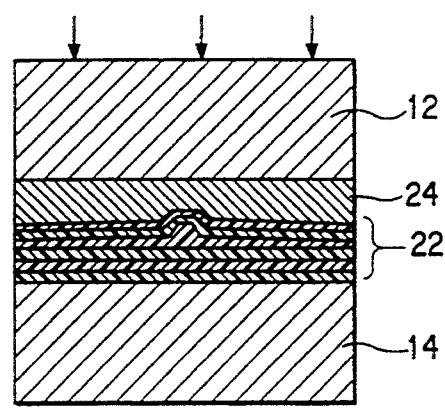

We now examine the behavior of the interlayer during the consolidation stage, first in the part interior, then around the periphery. The interlayer responds to the applied pressure by flowing and filling in the local tool gap/material thickness mismatches, in turn transmitting the required pressure to the entire surface of the composite article. FIGS. 2, 2A, 3, 3A, 4 and 4A show how the interlayer flows and compensates for the three tool gap/material thickness mismatches. More particularly, in FIG. 2 the exaggerated indentation 30 in the lower surface of tool 10 caused possibly because of machining tolerance creates a gap 32 which could allow voids to form in the material. However, as shown in FIG. 2A, using compliant interlayer 24 between the layered part 22 and the tool 12 allows the pressure to be evenly applied to the part, thus inhibiting voids. Even with a perfectly machined tool gap the material layers 22 themselves can create a gap mismatch by thinning as shown in FIG. 3 creating gap 34 or by wrinkling as shown in FIG. 4 creating gap 36. Again the interlayer 24 redistributes itself over these areas as shown in FIGS. 3A and 4A.

Figure 5:
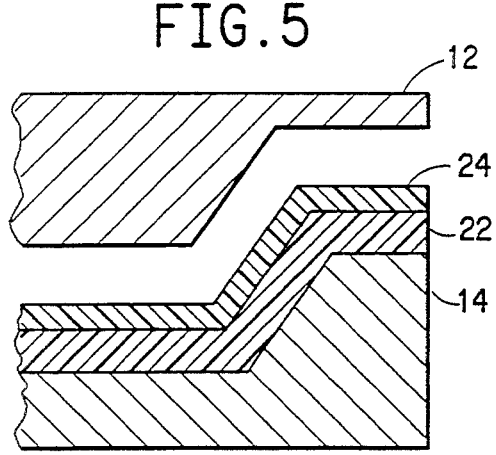
FIGS. 5, 5A, 5B, 6, 6A and 6B schematically illustrate how the compliant layer of this invention creates a seal after the part is formed and consolidation pressure is applied.
Figure 5A:
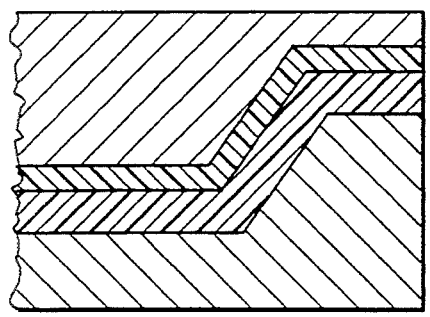
Figure 5B:
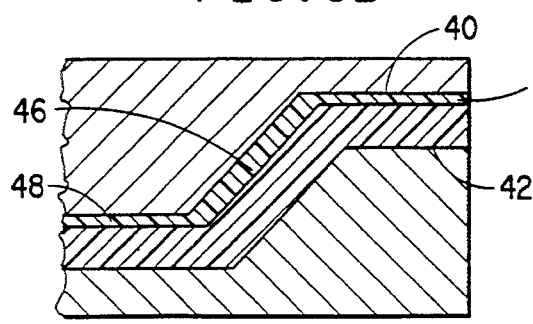

The behavior in the periphery is shown in FIGS. 5, 5A, 5B, 6, 6A, and 6B. FIGS. 5, 5A, and 5B show the case for a constant tool gap. FIG. 5 shows the beginning of the forming process; FIG. 5A shows the processes paused at the nominal tool gap; FIG. 5B shows the process as it progresses slightly past the nominal tool gap. The horizontal flange 40, 42 creates a tool gap 44 that is less than that of the interior of the part 46. Hence, though resin may be squeezed away from region 48, it is trapped in region 46 because of the flow resistance in the tool gap 44.

Figure 6:
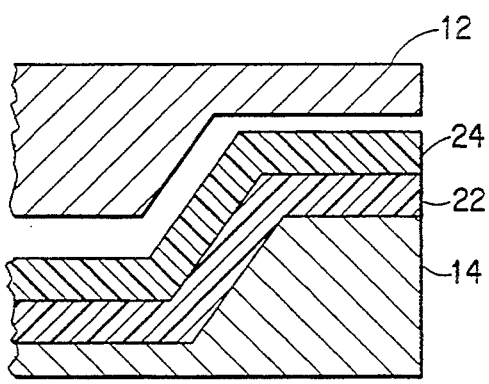
Figure 6A:
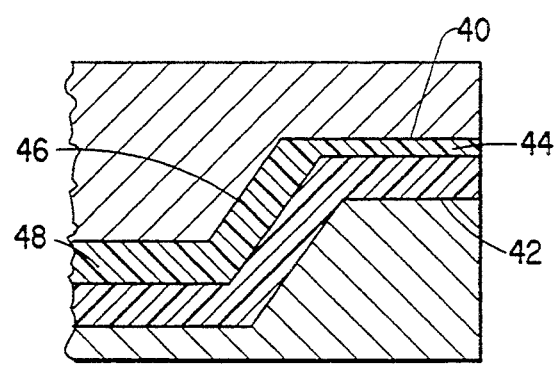
Figure 6B:
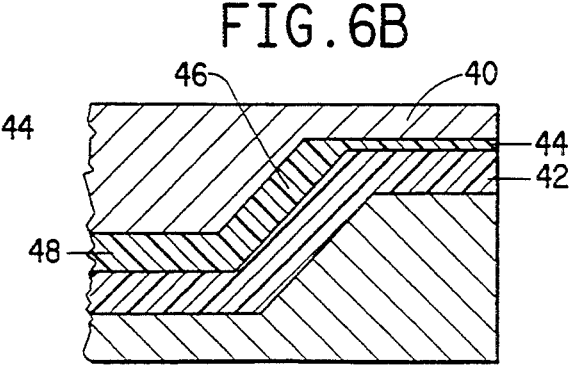

FIGS. 6, 6A, and 6B show the case where a reduced tool gap is designed into the periphery. FIG. 6 shows the beginning of the forming process. FIG. 6A shows the processes paused at the nominal tool gap. FIG. 6B shows the tool gap at the end of the process. Here the tool gap in the periphery 44 is clearly less than that in the interior 46, 48, restricting resin flow.

A composite dish part using a compliant composite interlayer in accordance with this invention was formed with a consolidation test tool as shown in FIG. 1. The tool has a nominal tool gap of 0.100 in and a horizontal flange around the perimeter in excess of 1 in.

For this example, a symmetric composite lay-up was prepared from layers of Poly-(ether ketone ketone) matrix (PEKK) reinforced with long, discontinuous AS4 carbon fibers, which layers were prepared in accordance with U.S. Pat. Nos. 4,759,985; 4,837,117; 4,856,146; 4,856,147, 4,857,385; and 4,863,780. Eight uniaxial plies of AS4-LDF TM /PEKK having dimensions 8.5×7 in. were stacked in alternating directions of 0 and 90 degrees, where 0 indicates alignment with the fiber direction. The lay-up consisted of semi-consolidated layers and was not fully consolidated into a sheet structure.

The compliant composite interlayer used for this example comprised a random chopped fiberglass/thermoplastic formulation. Poly-(ether-imide) (PEI) amorphous resin with a softening temperature of 217° C. was selected for the thermoplastic matrix of the compliant layer due to the fact that its softening temperature was significantly below the melt temperature of PEKK (356° C.) and thus exhibits good flow-ability at the molding temperature. Specifically, Ultem ® resin film with a film thickness of 0.005 in. manufactured by General Electric Company, Specialty Plastics Division of Pittsfield, Mass., was used for the PEI component. The fiberglass component used was a M-723 chopped strand mat manufactured by Owens Corning Fiberglass Corp. of Toledo, Ohio, with an areal density of 1.5 oz./ft$^2$ and a nominal compressed thickness of 0.007 in.

It was determined that a fiber volume fraction in the range of 20–30% is desirable for molded parts of complex geometry in order to balance resin flow with pressure buildup. To achieve the desired fiber volume fraction of 20% for this compliant interlayer, 32.8 weight % fiberglass and 67.2 weight % Ultem ® was used.

The total thickness of the compliant composite interlayer was determined to ensure compensation for the mismatch between the composite part and the nominal gap for the tool. Specifically, the nominal consolidated thickness for an 8 ply laminate of AS4-LDF TM /PEKK tape totals 0.044 in. and the tool had a nominal gap of 0.100 in., therefore, the compliant interlayer was required to have a total thickness of at least 0.056 in. For this example, a compliant composite interlayer of approximately 0.074 in. of thickness was prepared from the combination of 12 layers of 0.005 in. thick Ultem ® film and 2 layers of 0.007 in. thick chopped strand mat with relative weight of 68% for the Ultem and 32% for the fiberglass. For uniform through-thickness distribution, the compliant interlayer composite was prepared by positioning 4 layers of Ultem ®, 1 layer fiberglass, 4 layers Ultem ®, 1 layer fiberglass and the final 4 layers of Ultem ®, all layers having the dimensions 8.5×7 in. The excess thickness ensured that all gaps were filled. The slight excess in thickness resulted in squeezed out resin during molding.

To form the composite part, a stack of material was prepared comprising (1) a bottom layer of a 0.005 in. thick Upilex ®-R polyimide release film, having dimensions 9×9 in. sold by ICI Americas Corp., ICI Films Division, Hopewell, Va., and treated on both surfaces with mold release agent Frekote 33H manufactured by The Dexter Corp. of Seabrook, N.H., (2) topped by the AS4-LDF TM /PEKK composite layup, (3) followed by another treated polyimide release film, (4) followed by the compliant composite interlayer and (5) topped with treated polyimide release film. High temperature Kapton ® polyimide tape 1 in. wide manufactured by E. I. du Pont de Nemours and Company of Wilmington, Del. was used to seal the perimeter of the release films enclosing the compliant interlayer in order to retain excess resin flow.

The consolidation tool was preheated to between 370° to 390° C., which is approximately 15°–35° C. above the melt temperature of the PEKK matrix. The material stack to be formed was preheated by placing the stack into the heated tool. After approximately 40 minutes, the stack had achieved the desired temperature of 370° C., and was formed. After forming, pressure was initially applied in incremental steps of 50 psi average part pressure, allowing the pressure to equilibrate before applying the next 50 psi. Once the seal around the perimeter of the tool appeared to be effective, e.g. the incremental pressure did not drop off, the part was pressurized to the final consolidation pressure of 595 psi. This incremental pressure buildup prevented the compliant interlayer from prematurely expelling the resin.

The temperature and pressure were maintained for an additional 20 minutes to consolidate the lay-up into a formed dish part. Subsequently, the mold was air cooled at a rate of about 10° C./min down to below approximately 170° C. in order to allow for safe water cooling. The mold was then water cooled at rate of 25° C./min down to room temperature. The part was removed from the mold and the release layers and compliant interlayer were separated from the part.

The part quality was determined by wall thickness measurements of the consolidated part. Calculations based on flat panel tests correlated with ultrasonic C-scan measurements suggest that a consolidated 8-ply thickness should be 0.044 in. The formed part was measured on all walls as well as the horizontal sections. Part thickness ranged from 0.042 to 0.045 inches, indicating good, uniform consolidation.

A clear indication of how the compliant interlayer flows to redistribute pressure is seen by measuring the thickness of the compliant interlayer in the corresponding areas. The bottom of the compliant interlayer had a thickness of 0.004 in., the angled walls had a thickness of 0.009–0.016 in., and the vertical walls had a thickness of 0.039–0.040 in. These thicknesses agree well with the changes in the tool gap as the pressure is applied: The more horizontal the wall, the closer the two tool halves approach each other, while the vertical walls do not approach each other at all. Hence, the distribution of wall thicknesses in the compliant interlayer indicates flow of resin to account for tool gap mismatches for good consolidation.

A flat panel with a ply buildup was consolidated between flat press platens using a compliant composite interlayer in accordance with this invention.

For this example, a symmetric composite lay-up was prepared from layers of Poly-(ether ketone ketone) matrix (PEKK) reinforced with long, discontinuous AS4 carbon fibers, which layers were prepared in accordance with U.S. Pat. Nos. 4,759,985; 4,837,117; 4,856,146; 4,856,147; 4,857,385; and 4,863,780. Eight base uniaxial plies of AS4-LDF TM /PEKK having dimensions 6×6 in. were stacked in alternating directions of 0 and 90 degrees, where 0 indicates alignment with the fiber direction. Eight additional uniaxial plies of AS4-LDF TM /PEKK having dimensions 1×4 in. were also stacked in alternating directions of 0 and 90 degrees, and placed on top of the base plies to create a ply buildup. The ply buildup was slightly offset from the center of the panel. The entire lay-up consisted of semi-consolidated layers and was not fully consolidated into a sheet structure.

The compliant composite interlayer used for this example comprised a random chopped 0.25 in. carbon fiber/thermoplastic formulation. Poly-(ether-ketone ketone) (PEKK) resin was used to match the resin in the flat panel. The compliant interlayer material was prepared using a wet-lay paper making process to a fiber volume fraction of 30%.

The total thickness of the compliant composite interlayer was determined to ensure compensation for the mismatch between the composite part and the nominal gap for the tool. In this case, since the panel was to be consolidated between flat platens, the tool gap mismatch was the thickness of the 8-ply buildup. Specifically, the nominal consolidated thickness for an 8 ply laminate of AS4-LDF TM /PEKK tape totals 0.044 in., therefore, the compliant interlayer was required to have a total thickness of at least 0.044 in.

For this example, the consolidated thickness of a single layer of the wet-lay material was 0.008 in. A compliant composite interlayer of approximately 0.088 in. thickness was prepared from the combination of 8 layers of wet-lay material with 24 layers of 0.001 in. thick neat PEKK resin film manufactured by E. I. du Pont de Nemours and Company of Wilmington, Del. For uniform through-thickness distribution, the compliant interlayer composite was prepared by positioning 3 layers of PEKK film between each layer of wet-lay. The wet-lay had dimensions of 6×6 in.. The neat PEKK film was cut smaller, to 4×4 in., and centered within the square of the wet-lay, creating a resin-rich central section of the compliant interlayer over the region of the ply buildup. The excess thickness of the inner layer ensured that all gaps were filled. The slight excess in thickness resulted in squeezed out resin during molding.

To consolidate the composite part, a stack of material was prepared comprising (1) a 0.003 in. thick Kapton ® polyimide release film, having dimensions 9×9 in. manufactured by E. I. du Pont de Nemours and Company of Wilmington, Del., and treated with mold release agent Frekote 33H manufactured by The Dexter Corp. of Seabrook, N.H., at the bottom, (2) topped by the AS4-LDF TM /PEKK composite lay-up, (3) followed by another treated polyimide release film, (4) followed by the compliant composite interlayer and (5) topped with treated polyimide release film. High temperature Kapton ® polyimide tape 1 in. wide manufactured by E. I. du Pont de Nemours and Company of Wilmington, Del. was used to seal the perimeter of the release films enclosing the compliant interlayer in order to retain excess resin flow.

The platen press was preheated to 370° C., which is approximately 15° C. above the melt temperature of the PEKK matrix. The material stack to be consolidated was preheated by placing the stack into the heated tool. After approximately 5 minutes, the stack had achieved the desired temperature of 370° C., and the press was closed. Pressure was incremented in a sequence of 200, 300, 400, and 500 psi average part pressure, waiting 1 minute between each increment. Once the seal around the perimeter of the tool appeared to be effective, e.g. the incremental pressure did not drop off, the part was pressurized to the maximum capability of the press of 908 psi. equivalent average pressure over the part. This incremental pressure buildup prevented the excess resin in the central region of the compliant interlayer from being prematurely expelled.

The temperature and pressure were maintained for an additional 20 minutes to consolidate the lay-up into a panel. Subsequently, the platens were air cooled at a rate of about 10° C./min down to below approximately 170° C. in order to allow for safe water cooling. The platens were then water cooled at rate of 25° C./min down to room temperature. The stack was removed from the press and the release layers and compliant interlayer were separated from the panel.

The part quality was determined by two methods. One was thickness measurements of the consolidated panel. Calculations based on flat panel tests correlated with ultrasonic C-scan measurements suggest that a consolidated 8-ply thickness should be 0.044 in. The panel averaged 0.044 in. in the 8-ply base, and 0.079 in. over the 8-ply additional buildup, indicating good consolidation in the thin section of the part. The panel was also ultrasonically C-scanned, with an average loss of 2.5 dB over the surface, also indicating good consolidation.

A flat panel with a ply buildup was consolidated between flat press platens using a compliant composite interlayer in accordance with this invention, with the addition of a tailored tool gap to enhance the flow restriction about the periphery of the tool.

For this example, a symmetric composite lay-up was prepared from layers of Poly-(ether ketone ketone) matrix (PEKK) reinforced with long, discontinuous AS4 carbon fibers, which layers were prepared in accordance with U.S. Pat. Nos. 4,759,985; 4,837,117; 4,856,146; 4,856,147; 4,857,385; and 4,863,780. Eight base uniaxial plies of AS4-LDF TM /PEKK having dimensions 6×6 in. were stacked in alternating directions of 0 and 90 degrees, where 0 indicates alignment with the fiber direction. Eight additional uniaxial plies of AS4-LDF ™/PEKK having dimensions 1×3 in. were also stacked in alternating directions of 0 and 90 degrees, and placed on top of the base plies to create a ply buildup. The ply buildup was slightly offset from the center of the panel. The entire lay-up consisted of semi-consolidated layers and was not fully consolidated into a sheet structure.

The compliant composite interlayer used for this example comprised a random chopped fiberglass/thermoplastic formulation. Poly-(ether-imide) (PEI) amorphous resin with a softening temperature of 217° C. was selected for the thermoplastic matrix of the compliant layer due to the fact that its softening temperature was significantly below the melt temperature of PEKK (356° C.) and thus exhibits good flow-ability at the molding temperature. Specifically, Ultem ® resin film with a film thickness of 0.005 in. manufactured by General Electric Company, Specialty Plastics Division of Pittsfield, Mass., was used for the PEI component. The fiberglass component used was a M-723 chopped strand mat manufactured by Owens Corning Fiberglass Corp. of Toledo, Ohio, with an areal density of 1.5 oz./ft$^2$ and a nominal compressed thickness of 0.007 in.

With the additional flow restriction about the periphery of the tool, lower fiber volume fractions may be used in the compliant interlayer, since the tool gap enhances the flow restriction caused by the fibers. For this example, a 20% fiber volume was used, achieved with 32.8 weight % fiberglass and 67.2 weight % Ultem ®.

The total thickness of the compliant composite interlayer was determined to ensure compensation for the mismatch between the composite part and the nominal gap for the tool. In this case, since the panel was to be consolidated between flat platens, the tool gap mismatch was the thickness of the 8-ply buildup. Specifically, the nominal consolidated thickness for an 8 ply laminate of AS4-LDF ™/PEKK tape totals 0.044 in., therefore, the compliant interlayer was required to have a total thickness of at least 0.044 in.

For this example, a compliant composite interlayer of approximately 0.222 in. of thickness was prepared from the combination of 36 layers of 0.005 in. thick Ultem ® film and 6 layers of 0.007 in. thick chopped strand mat with relative weight of 68% for the Ultem and 32% for the fiberglass. For uniform through-thickness distribution, the compliant interlayer composite was prepared with the following sequence of number of layers of Ultem ® film between each layer of fiberglass: 4/5/6/6/6/5/4. All layers of resin and fiberglass had dimensions 8.5×7 in. The excess thickness of the interlayer ensured that all gaps were filled, and allowed evaluation of the ability of the tailored tool gap to enhance pressure buildup in the center of the panel.

To consolidate the composite part, a stack of material was prepared comprising (1) a bottom layer of a 0.003 in. thick Kapton ® polyimide release film, having dimensions 9×9 in. manufactured by E. I. du Pont de Nemours and Company of Wilmington, Del., and treated with mold release agent Frekote 33H manufactured by The Dexter Corp. of Seabrook, N.H., (2) topped by the AS4-LDF ™/PEKK composite lay-up, (3) followed by another treated polyimide release film, (4) followed by the compliant composite interlayer and (5) topped with treated polyimide release film. High temperature Kapton ® polyimide tape 1 in. wide manufactured by E. I. du Pont de Nemours and Company of Wilmington, Del. was used to seal the perimeter of the release films enclosing the compliant interlayer in order to retain excess resin flow.

On top of this stack was placed a square metal picture frame with a thickness of 0.045 in., 6×6 in. outer dimensions, with a 4×4 in. region cut from the center. This picture frame reduces the nominal tool gap around the periphery of the panel by 0.045 in.

The platen press was preheated to 370° C., which is approximately 15° C. above the melt temperature of the PEKK matrix. The material stack to be consolidated and the metal picture frame were preheated by placing the stack into the heated tool. After approximately 5 minutes, the stack had achieved the desired temperature of 370° C., and the press was closed. Pressure was incremented in steps of 50 psi average part pressure, waiting between each increment until the pressure ceased to decay. Once the seal around the perimeter of the tool appeared to be effective, e.g. the incremental pressure did not drop off, the part was pressurized to the maximum capability of the press of 908 psi. equivalent average pressure over the part. This incremental pressure buildup prevented the excess resin in the central region of the compliant interlayer from being prematurely expelled.

The temperature and pressure were maintained for an additional 20 minutes to consolidate the lay-up into a panel. Subsequently, the platens were air cooled at a rate of about 10° C./min down to below approximately 170° C. in order to allow for safe water cooling. The platens were then water cooled at a rate of 25° C./min down to room temperature. The stack was removed from the press and the release layers and compliant interlayer were separated from the panel.

The part quality was determined by two methods. One was thickness measurements of the consolidated panel. Calculations based on flat panel tests correlated with ultrasonic C-scan measurements suggest that a consolidated 8-ply thickness should be 0.044 in. The panel averaged 0.047 in. in the 8-ply base, and 0.079 in. over the 8-ply additional buildup, indicating good consolidation in the thin section of the part. The panel was also ultrasonically C-scanned, with an average loss of 2.5 dB over the buildup and 3 dB over the remainder, indicating good consolidation.

Flat panels with internal ply drops were consolidated between flat press platens using a compliant composite interlayer in accordance with this invention.

For this example, a symmetric composite lay-up was prepared from layers of Poly-(ether ketone ketone) matrix (PEKK) reinforced with long, discontinuous AS4 carbon fibers, which layers were prepared in accordance with U.S. Pat. Nos. 4,759,985; 4,837,117; 4,856,146; 4,856,147; 4,857,385; and 4,863,780. Sixteen base uniaxial plies of AS4-LDF ™/PEKK having dimensions 6×6 in. were stacked in alternating directions of 45, 0, −45, and 90 degrees, where 0 indicates alignment with the fiber direction. A square composite picture frame with varying thicknesses and 6×6 inch outer dimensions with a 4×4 inch region cut from the center, made from the same AS4/PEKK material, was placed onto the base panel to simulate an internal ply drop. The entire lay-up consisted of semiconsolidated layers and was not fully consolidated into a sheet structure.

The compliant composite interlayer used for this example comprised a knit fiberglass cloth/thermoplastic formulation. Poly-(ether-ketone ketone) (PEKK)

resin was used to match the resin in the flat panel. The fiberglass component used was a knit fiberglass cloth manufactured by Owens Corning Fiberglass Corp. of Toledo, Ohio. PEKK film, approximately 0.001 in. thick, manufactured by E. I. du Pont de Nemours and Company of Wilmington, Del., was used for the resin.

The total thickness of the compliant composite interlayer was determined to ensure compensation for the mismatch between the composite part and the nominal gap for the tool. In this case, since the panel was to be consolidated between flat platens, the tool gap mismatch was the thickness of the perimeter picture frame shim. This series of tests examined differential thicknesses from 1 to 8 plies thick. Since the nominal consolidated thickness for an 8 ply laminate of AS4-LDF TM /PEKK tape totals 0.044 in., the compliant interlayer was required to have a total thickness of at least 0.044 in. to handle the maximum thickness mismatch.

For this example, a compliant composite interlayer of approximately 0.048 in. of thickness was prepared from the combination of 26 layers of approximately 0.001 in. thick PEKK film and 1 layer of 0.018 in. thick knit fiberglass cloth to create a fiber volume fraction of approximately 32%. For uniform through-thickness distribution, the compliant interlayer composite was prepared with the resin evenly divided into two stacks of 13 layers on each side of the fiberglass cloth. All layers of resin and fiberglass had dimensions 6×6 in.

To consolidate the composite part, a stack of material was prepared comprising (1) a 0.002 in. thick Upilex ®-R polyimide release film, having dimensions 9×9 in. sold by ICI Americas Corp., ICI Films Division, Hopewell, Va., and treated with mold release agent Frekote 33H manufactured by The Dexter Corp. of Seabrook, N.H., at the bottom, (2) topped by the AS4-LDF TM /PEKK composite layup, (3) followed by another treated polyimide release film, (4) followed by the compliant composite interlayer and (5) topped with treated polyimide release film. High temperature Kapton ® polyimide tape 1 in. wide manufactured by E. I. du Pont de Nemours and Company of Wilmington, Del. was used to seal the perimeter of the release films enclosing the compliant interlayer in order to retain excess resin flow.

A picture frame tool, with a 6×6 in. interior to accept the stack, was placed into a platen press and preheated to 370° C., which is approximately 15° C. above the melt temperature of the PEKK matrix. The material stack to be consolidated was preheated by placing the stack into the heated tool. After approximately 20 minutes, the stack had achieved the desired temperature of 370° C., and the press was closed. Pressure of either 200 or 1000 psi. equivalent part pressure was applied in a single step. The inherent geometry of the picture frame tool and the ply drop creates a natural flow restriction which prevents excess resin from squeezing out.

The temperature and pressure were maintained for an additional 10 minutes to consolidate the lay-up into a panel. Subsequently, the platens were air cooled at a rate of about 10° C./min down to below approximately 175° C. in order to allow for safe water cooling. The platens were then water cooled at rate of 25° C./min down to room temperature. The stack was removed from the press and the release layers and compliant interlayer were separated from the panel.

The part quality was determined by two methods. One was thickness measurements of the consolidated panel, with the average differential thickness between the base laminate and the surrounding shim indicating a good degree of consolidation.

What is claimed is:

1. A method for forming a consolidated part having interior and peripheral surfaces from a thermoplastic resin sheet having a high melt-forming temperature in an open mold press comprising:

applying a compliant layer to at least one face of said sheet said compliant layer being a reinforced thermoplastic resin matrix having a melt-forming temperature substantially the same as said resin sheet and a melt viscosity less than said resin sheet;

placing the sheet and the layer in the press, heating the sheet and the layer to the melt-forming temperature of the sheet, closing the press to form the part;

applying pressure by means of the press to flow said compliant layer to provide uniform contact between said compliant layer, said press and said part whereby a low flow resistance of the compliant layer over the interior surface of the part allows the compliant layer to transmit said pressure against said part to consolidate the part and a high flow resistance of the compliant layer over the peripheral surface of the part allows the compliant layer to build and maintain said pressure with a minimum of compliant layer squeeze-out from the press;

cooling the part; and removing the part from the press.

2. The method of claim 1, said press having opposed surfaces movable toward each other for consolidating said part, said compliant layer being one of said surfaces rather than being applied to one face of the sheet.

3. The method of claim 1, including preheating said sheet and said compliant layer prior to placing said sheet in said press.

4. The method of claim 1, said thermoplastic resin matrix of said compliant layer being reinforced with fibers.

5. The method of claim 1, said thermoplastic resin matrix of said layer being reinforced with hollow glass microspheres.

6. The method of claims 1, 2, 3, 4 or 5 wherein said thermoplastic resin sheet is reinforced with fibers.

* * * * *